(12) United States Patent
Hyytiäinen

(10) Patent No.: US 7,441,144 B2
(45) Date of Patent: Oct. 21, 2008

(54) COMPUTER CLUSTER, COMPUTER UNIT AND METHOD TO CONTROL STORAGE ACCESS BETWEEN COMPUTER UNITS

(75) Inventor: Harri Hyytiäinen, Helsinki (FI)

(73) Assignee: Nokia Corporation, Espoo (FI)

( * ) Notice: Subject to any disclaimer, the term of this patent is extended or adjusted under 35 U.S.C. 154(b) by 470 days.

(21) Appl. No.: 10/756,336

(22) Filed: Jan. 14, 2004

(65) Prior Publication Data

US 2005/0102559 A1 May 12, 2005

(30) Foreign Application Priority Data

Nov. 10, 2003 (FI) .................................. 20031628

(51) Int. Cl.
*G06F 11/00* (2006.01)

(52) U.S. Cl. .......................................................... 714/6

(58) Field of Classification Search ...................... 714/6
See application file for complete search history.

(56) References Cited

U.S. PATENT DOCUMENTS

| | | | |
|---|---|---|---|
| 5,675,723 A | 10/1997 | Ekrot et al. | |
| 5,928,367 A * | 7/1999 | Nelson et al. ................... | 714/6 |
| 5,951,695 A * | 9/1999 | Kolovson ...................... | 714/16 |
| 6,360,331 B2 * | 3/2002 | Vert et al. ....................... | 714/4 |
| 6,408,399 B1 | 6/2002 | Baughman | |
| 6,453,426 B1 * | 9/2002 | Gamache et al. ................ | 714/4 |
| 6,578,055 B1 * | 6/2003 | Hutchison et al. ........... | 707/204 |
| 6,609,213 B1 | 8/2003 | Nguyen et al. | |
| 7,055,053 B2 * | 5/2006 | Saika ............................ | 714/4 |
| 7,263,584 B2 * | 8/2007 | Nakayama et al. .......... | 711/114 |
| 2002/0007470 A1 * | 1/2002 | Kleiman ......................... | 714/6 |
| 2005/0050392 A1 * | 3/2005 | Baba et al. ..................... | 714/25 |

* cited by examiner

*Primary Examiner*—Robert Beausoliel
*Assistant Examiner*—Amine Riad
(74) *Attorney, Agent, or Firm*—Squire, Sanders & Dempsey

(57) ABSTRACT

A method, computer cluster and computer unit for performing storage access shift between computer units. A redundant computer cluster comprises computer units and a shared storage unit. The computer units interface the shared storage unit, which stores data storage resources to which access has been established by a replicated service unit executed the computer cluster. When switchover condition associated with the replicated service unit is detected, the data storage resources to which access has been established from the service unit are first released in the service unit replica that will enter standby state. Thereafter, the access is established to the data storage resources in the service unit replica that will enter active state. Only then the replica of the service unit is allowed to become active. The benefits of the invention are related to the improved performance and reliability of file system access from a redundant multi-node computer cluster.

26 Claims, 6 Drawing Sheets

COMPUTER CLUSTER, COMPUTER UNIT AND METHOD TO CONTROL STORAGE ACCESS BETWEEN COMPUTER UNITS

BACKGROUND OF THE INVENTION

1. Field of the Invention

The invention relates to computer systems in critical environments. Particularly, the invention relates to redundant computer clusters and the facilitation of switchovers therein using storage access shift between computer units, for example, server nodes.

2. Description of the Related Art

Reliability is an important factor in communication networks or in general in any other critical system environment. It is important that continuous and uninterrupted service experience is provided to end-users despite the fact that there may be failures in computer hardware and software. It is important that interruptions in transactions are minimized. Examples of transactions may include data communication sessions and database transactions. Further, it must be possible to perform management actions in computer systems without affecting end-user experience. For example, it must be possible to activate, deactivate, add, remove and replace subsystems as transparently and as quickly as possible. In critical environments subsystems comprising hardware and/or software are replicated so that there are backup subsystems ready to replace subsystems that become faulty. Such subsystems are often hot-swappable. Subsystems may be replicated so that there is one backup subsystem for each active subsystem or so that there is one backup subsystem for a group of subsystems. By a subsystem in this case is meant a set comprising at least one hardware unit and/or a set comprising at least one software component. A hardware unit can be, for example, a processor unit, an interface card and a communication link. A software component can be, for example, a group of processes or a group of threads executing in a processor unit. A subsystem may also comprise both software and hardware. For example, a communication link subsystem may comprise a line interface card and a set of processes executing in an associated processor unit. Typically, there are a number of similar line interface cards each of which comprises a subsystem including line interface card hardware and software executing in a processor unit to which the line interface card is associated. Typically, the backup subsystem i.e. replica in the case of a software process is executing in another computer unit than its active pair process.

There is a consortium called Service Availability Forum (SA Forum), which is developing two layers of standard carrier-grade interfaces. A system is said to be carrier grade, if it has ability to provide uninterrupted service without loss of service continuity and delivery. The SA Forum specifications have an application interface and a platform interface. The application interface provides access to a standard set of tools for application software to use in order to distribute its processing over multiple computing elements. The tools will respond to failures of those elements without loss of service continuity and delivery to any user. The tools are provided through management middleware that conforms to the application interface specification. The platform interface is used to access operating system level. Its purpose is to hide the operating system level differences across different platforms. In SA Forum specification concepts there are Service Groups (SG), which comprise at least one Service Unit (SU). In turn each SU comprises at least one component. A component may be a software process or a thread. A component may have associated to it also hardware units. In other words an SU is a subsystem, which can be an active subsystem or a redundant subsystem acting as a replacement for the active subsystem. An SU is replicated in the sense that in an SG there is at least one SU in active state and at least one SU in standby state. The SU in standby state will act as a backup replica of the SU in active state. If the active SU becomes failed or is to be taken down for maintenance, the replica SU becomes active and takes over the tasks of the SU failed or taken down. The concepts from the SA Forum specifications are used herein for illustrative purposes. They may be replaced by other equivalent concepts. The invention and its embodiments are thus not limited to systems and implementations that are explicitly SA Forum specification compliant.

Reference is now made to FIG. 1, which illustrates the aforementioned SA Forum specification concepts. In FIG. 1 there is a redundant two-unit computer cluster having computer units 110 and 112. The computer units are connected using a communication channel 104. Communication channel 104 may be, for example, an Ethernet segment or a PCI bus. There are three SGs, namely SGs 140-144. In each SG there are two SUs. In SG 140 there is SU 120 and 130, in SG 142 SU 122 and SU 132 and in SG 144 SU 124 and 134. SUs 120, 132 and 124 are in active state and SUs 130, 122 and 134 in standby state. For each active SU, there is a spare SU in standby state. For instance, in case there is a switchover in SG 142 due to some failure or management action in SU 132, SU 122 becomes active and takes over the tasks of SU 132. The state of SU 132 becomes "standby" or "not present" or any other state, which reflects the situation in SU 132. If failure occurs at computer unit level and computer unit 110 fails, SUs 130-134 in computer unit 112 must take the place of the peer SUs 120-124 in the failed computer unit 110.

In redundant computer clusters, for example, in active-standby redundancy, redundant applications will usually access a given shared data storage resource only via one unit i.e. node at a time because of software limitations. By a data storage resource is meant in this context, for example, a File System (FS), a Software RAID (Redundant Arrays of Independent Disk) or logical volumes of Logical Volume Management (LVM). By data storage access establishment is in this context meant, for example, File System (FS) mounting, software RAID (Redundant Arrays of Independent Disks) startup or logical volume deployment of Logical Volume Management (LVM). It should be noted that e.g. when a Software RAID is started up in a unit, it involves only the establishment of readiness in operating system level to read from or write to the Software RAID. The file systems usually have been created earlier so it is not question of Software RAID set-up. A read-write access to a data storage resource can be established only from one unit at a time in order to avoid e.g. file system crash or any incoherent state of the data storage resource. By the read-write access of a data storage resource is meant an access, which allows that the entity that established the access to the data storage resource to modify data in the data storage resource. If a unit has established read-write access to a given data storage resource, usually no other units may establish even a read access to the data storage resource. This is particularly the case in file system read-write mounting.

In the case of read access establishment only reading of the data storage resource is allowed for the entity that performed the access establishment.

A Software RAID behaves from user point of view like any block device such as a partition on a single disk. In other words, it is a virtual device. Onto a Software RAID file systems may be created like to any other block device. In other words, it may be formatted. Examples of file systems are ext2 and Reiserfs familiar from the Linux operating system. In Linux the mounting of a given file system comprises the attaching of the directory structures contained therein to the directory structure of the computer performing the mounting. The directory structure is mounted at a specified mount point, which is a certain subdirectory within the directory structure. During the mounting file system directory structures retrieved from the storage volume may be cached at least partly by operating system in computer volatile memory. Some other file system information may also be retrieved from the storage volume and cached during the mounting, for example, disk space allocation information. The mounting of file systems is essentially similar in any present operating system such as Microsoft Windows. The differences pertain mostly to the mechanisms how files on the mounted file systems are identified. For instance, instead of attaching them to a single directory tree, in Windows mounted file systems are identified using letters such as A, D, E, F and so on. Usually letter C denotes local hard disk drive.

By mounting is meant herein that the file system to be mounted is prepared ready for general file access operating system services such as open, read, write and close in the system that performed the mounting. The file access operating system services are such that they operate in terms of individual identifiable files instead of bulk secondary storage.

It is possible for multiple units to access a given file system so that they merely read-only mount the file system. In practice an active unit or active software entity, that is, an active subsystem, will be the one accessing the file system and owning its read-write mount. Similarly, in the case of a Software RAID, an active unit or active software entity will be the one establishing and owning read-write access to the Software RAID. In SA Forum terminology this means that the active SU will own the read-write access to the data storage resource. This means that it owns e.g. file system mount, Software RAID access or LVM access. If the active entity i.e. the active SU gets failed or if the operator has to switch the active-standby roles, for example, due to software upgrades or any other management actions, the data storage resource access has to be shifted safely from the old SU to the new SU, that is, usually from a first unit to a second unit.

Reference is now made to FIG. 2, which illustrates the policy discussed above. In FIG. 2 there is a redundant two-unit computer cluster having computer units 110 and 112. The computer units are connected using a communication channel 104, which is a local area network (Ethernet). The computer units are connected to a disk storage unit 200 using a fiber channel 202, which provides high-bandwidth access. The disk storage unit has volumes 250, 252 and 254. The volumes have been assigned volume labels V1, V2 and V3, respectively. In this case a volume is an abstraction that may in practice be a hard disk drive, a group of hard disk drives or a partition within a hard disk drive comprising a specified number of cylinders from that hard disk drive. A volume may also be a RAID logical volume. The concept volume represents a block of storage, which appears logically contiguous and can be accessed using standard mechanisms. A file system may be created onto the volumes. The file system may be, for example, a Linux ext2 or Reiserfs. Other examples of file systems are NTFS and FAT32 from the Microsoft Windows operating system. The file system comprises the directory, file and access data structures and their storage formats on the volume. File systems 260, 262 and 264 have been created onto volumes 250, 252 and 254, respectively. During the file system creation step, the file system data structures are allocated and created to the volume. In the case of FIG. 2 the file systems 260, 262 and 264 are Linux ext2 file systems. Computer units 110 and 112 operate under operating systems 220 and 222, respectively. Operating system 220 has read-write mounted file system 260 and read mounted file system 264. This is illustrated in FIG. 2 using the directions of the arrows between the operating system and the file systems. Whereas, operating system 222 has read-write mounted file system 262 and read mounted file system 264. This reflects the principle that if a single unit read-write mounts a given file system, other units may not mount it. If a given volume is only read mounted by each mounting unit, several units may mount it. If an active SU executing in computer unit 110 should move to standby state and a passive SU executing in computer unit 112 should become active, a problem arises if that SU needs read-write access to file system 260. When the backup SU executing in computer unit 112 enters active state, file system 260 remains unmounted on computer unit 112 and SU has no possibility to read from or write to file system 260. A problem of the solution such as illustrated in FIG. 2 is that the file system mounting occurs at native operating system e.g. at Linux level. If there are switchovers that occur at SG level where a standby SU must take the place of an active SU, the operating system may not be affected or informed. Therefore, such SG level switchovers are transparent at operating system level.

In order to overcome the problem mentioned above some solutions from prior art can be applied. One such solution is to use file systems 260 and 262 from computer units 110 and 112 using Network File System (NFS). In the NFS it is possible for both computer units to access both file systems in read-write mode simultaneously. However, only separate files within the file system become simultaneously accessible. Whenever user opens a given file for writing, it becomes read-only accessible to other simultaneous users.

Reference is now made to FIG. 3, which illustrates the use of a network file system such as the NFS. In FIG. 3 there is a redundant two-unit computer cluster having computer units 110 and 112. The computer units are connected using a communication channel 104. Communication channel 104 may be, for example, an Ethernet segment or a PCI bus. Computer units 110 and 112 are connected to a file server 300 running the NFS. File server 300 is connected to a disk storage unit 200 using fiber channel. Disk storage unit 200 has file systems 260 and 262 as in FIG. 2. File server 300 has the NFS, which enables remote clients such as computer units 110 and 112 establish read-write access to file systems actually mounted only on file server 300. The NFS mounting imitates in remote clients local mounting. Now it is possible for computer unit 110 to perform read-write NFS mount to both file systems 260 and 262. There are now read-write NFS mounts 320 and 322 from computer unit 110 to file systems 260 and 262. Similarly, there are now read-write NFS mounts 324 and 326 from computer unit 112 to file systems 260 and 262.

The drawback of the prior art NFS mount based solution such as illustrated in FIG. 3 is poor performance. The use of file server 300 and NFS slows down access to file systems 260 and 262 significantly compared to the case where computers units 110 and 112 interface the disk storage unit 200 and are able to move large sequences of disk blocks to/from disk storage unit 200 without an another computer unit and its intervening network file system software. Additionally, the disk access has to be shifted safely from the old SU to the new SU so that there is no overlapping moment when the units access same logical storage entity e.g. a file system simultaneously in read-write access mode. In this way file system consistency can be retained. Yet another drawback of the prior art NFS mount based solution such as illustrated in FIG. 3 is that file server 300 becomes a single point of failure in the system. If file server 300 is replicated, the same problems arise as in FIG. 2, because replicas for file server 300 would need simultaneous read-write mounting of file systems 260 and 262. Therefore, the situation is not improved essentially.

PURPOSE OF THE INVENTION

The purpose of the invention is to solve the problems discussed above. Particularly, the purpose of the invention is to ensure reliable transfer of read-write mounts between service units during switchover.

SUMMARY OF THE INVENTION

The invention relates to a method for performing switchover in a redundant computer cluster, which comprises at least a first computer unit, a second computer unit and a shared storage unit. The first and second computer units interface the shared storage unit, which comprises at least one data storage resource accessed by a replicated service unit executed in the computer cluster. In the method a switchover condition associated with the replicated service unit is detected; access to at least one data storage resource is released by the first computer unit; access is established to the at least one data storage resource by the second computer unit; and a replica of the service unit is allowed to become active in the second computer unit.

The invention relates also to a redundant computer cluster, which comprises at least a first computer unit, a second computer unit and a shared storage unit. The first and the second computer units interface the shared storage unit, which comprises at least one data storage resource accessed by a replicated service unit executed in the computer cluster. The computer cluster further comprises: switchover control means for detecting a switchover condition associated with the replicated service unit; access releasing means in the first and second computer units for releasing access to the at least data storage resource; access establishment means in the first and second computer units for establishing access to the at least one data storage resource; and switchover control means for activating a replica of the service unit after successful access establishment to the at least data storage resource.

The invention relates also to a computer unit interfacing at least one shared storage unit. The computer unit executes at least one replicated service unit that requires access to at least one data storage resource on the shared storage unit. The computer unit further comprises: switchover control means for detecting a switchover condition associated with any of the at least one replicated service units; access releasing means for releasing access to the at least one data storage resource; access establishment means for establishing access to the at least one data storage resource; switchover control means for activating the service unit after successful access establishment to the at least one data storage resource; and switchover control means for altering the state of the service unit after successful releasing of access to the at least one data storage resource.

In one embodiment of the invention the access establishment, releasing and switchover control means are software components such as, for example, processes, threads or subroutines. In one embodiment of the invention the access establishment and access releasing steps are performed by an access proxy, which is associated e.g. with each service unit that uses read-write access to a data storage resource. The access proxy may be a component within the service unit. The component may be a process or a thread, which is treated by the switchover control system as part of the service unit. The switchover control system may comprise several switchover control services i.e. means. When the state of the service unit is being altered, the access proxy is also signaled about the switchover condition. In that way the access proxy is able to detect when access establishment or release of access is to be performed. There is no need to alter the operating system level software due to the existence of the access proxy.

In one embodiment of the invention, the data storage resource is a file system and the establishment of access to the file system is the mounting of the file system. Similarly, the releasing of access to the file system is the unmounting of the file system.

In one embodiment of the invention, the shared storage unit is a logical unit comprising several physical storage units. In this embodiment, the data storage unit may be, for example, a RAID logical unit if RAID is used. In one embodiment, the shared storage unit is a single physical storage unit.

In one embodiment of the invention, the shared storage unit is a disk storage unit. The data storage resource may be, for instance, a Software Redundant Array of Independent Disk (RAID) or a file system. In one embodiment of the invention the first and second computer units interface the shared storage unit using a peripheral interface, which may be, for instance, the Fiber Channel (FC), the Small Computer System Interface (SCSI), Internet Small Computer System Interface (iSCSI) or the Integrated System Interface (ISA).

The benefits of the invention are related to the improved performance and reliability of data storage resource access in a redundant multi-unit computer cluster. The use of intermediate units and network file system software between mounting computer units and the shared storage unit is avoided. In that way significant delays are avoided. The performing of the switchovers in the computer cluster is made more flexible. This is achieved by making an association between a service unit and the data storage resource to which read-write access has been established from the service unit. The data storage resource access shifting is thus bound to the states of the service units and the component service instances therein. Further, it is made possible that service units in separate service groups can perform switchover independently.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE PREFERRED EMBODIMENTS

Reference will now be made in detail to the embodiments of the present invention, examples of which are illustrated in the accompanying drawings.

Figure 1:
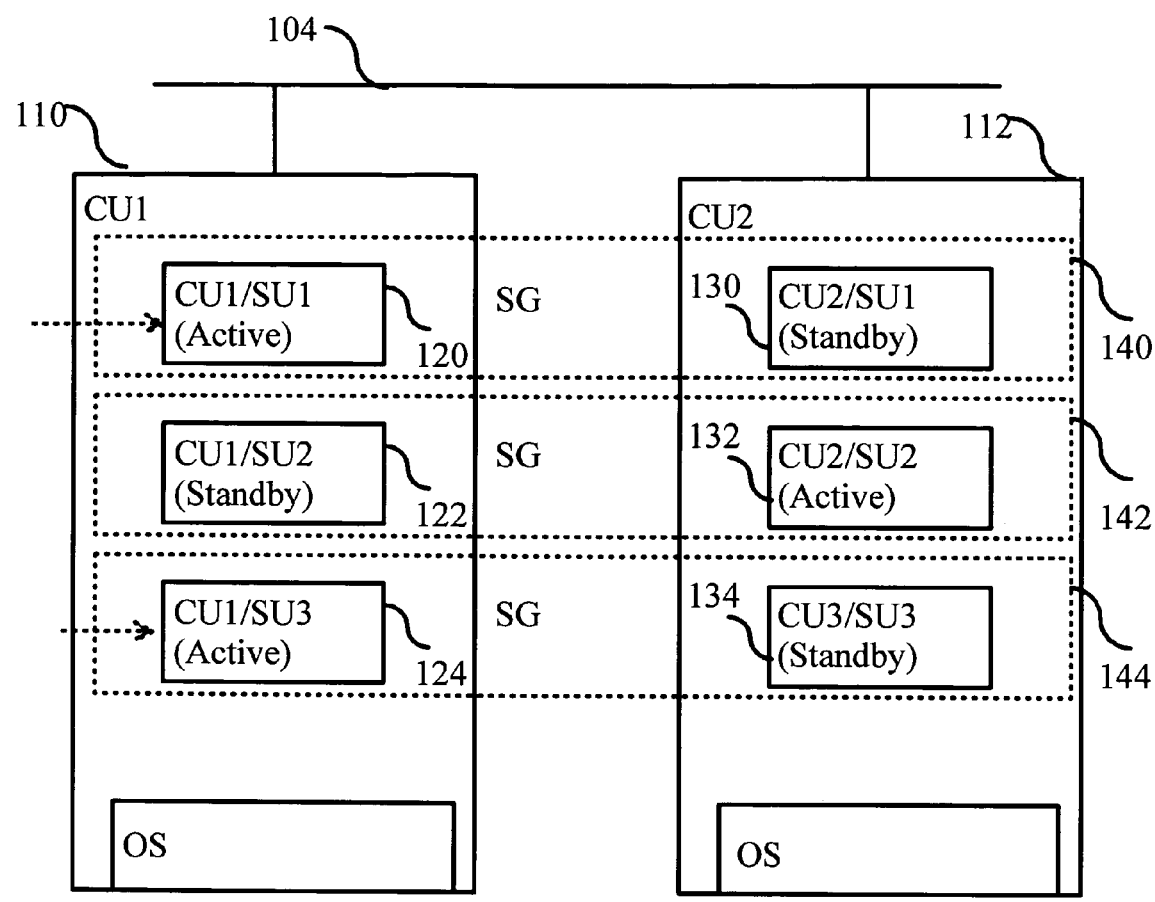
FIG. 1 is a block diagram illustrating a prior art redundant two-unit computer cluster and the Service Unit (SU) and the Service Group (SG) concepts of the SA Forum architecture.
Figure 2:
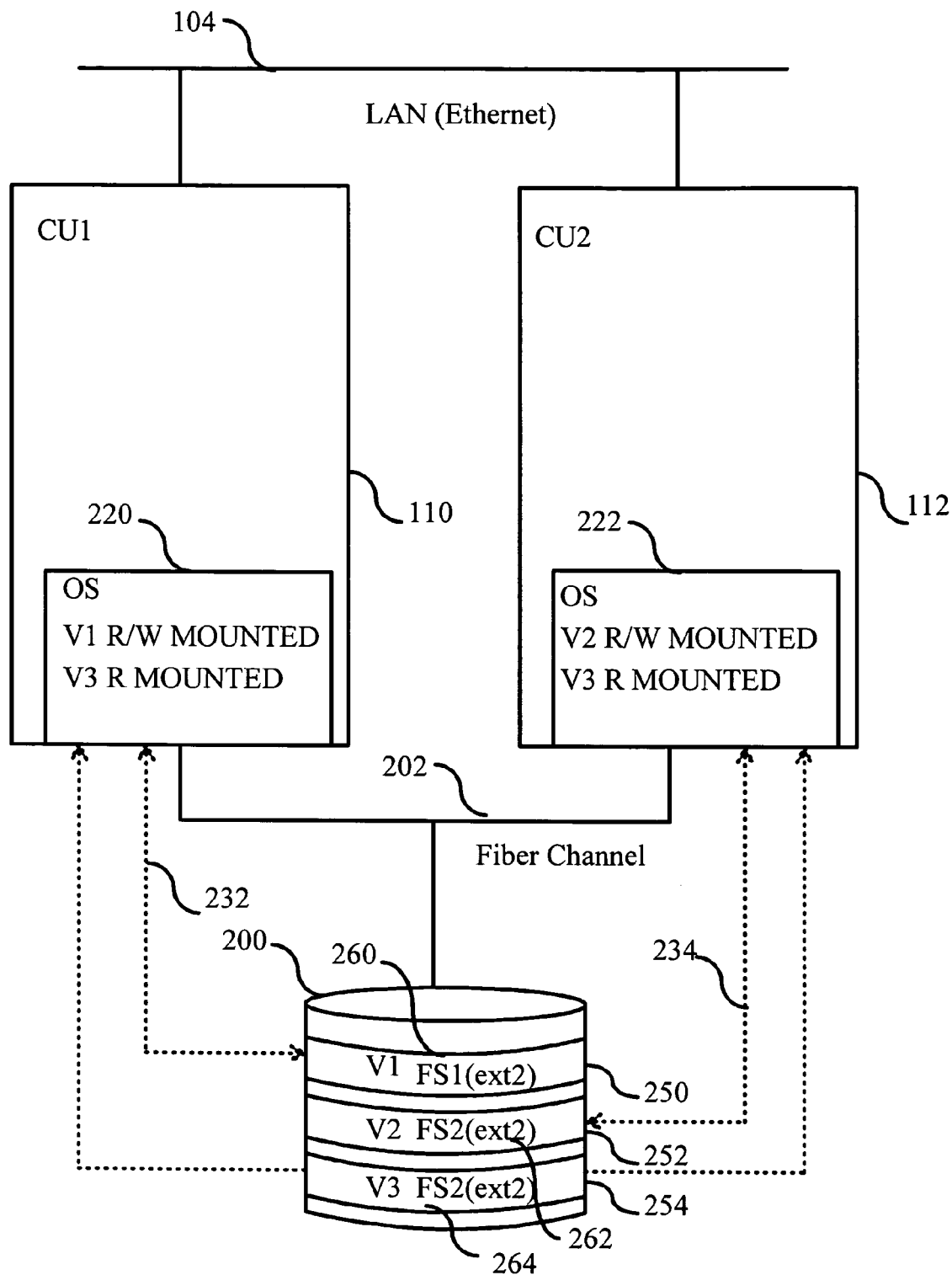
FIG. 2 is a block diagram illustrating a prior art redundant two-unit computer cluster using a shared disk storage unit.
Figure 3:
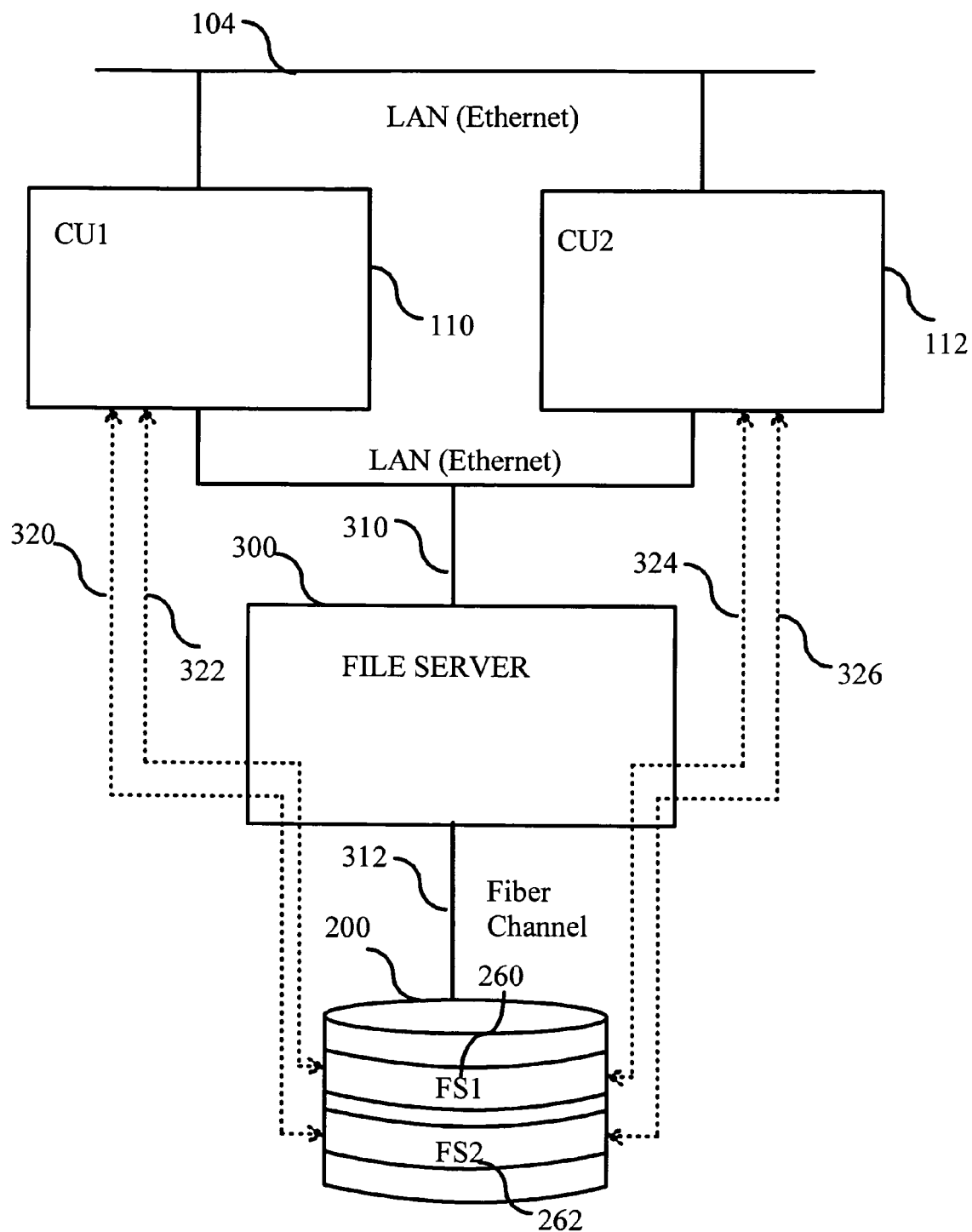
FIG. 3 is a block diagram depicting a redundant two-unit computer cluster using network file systems via a common file server unit.
Figure 4:
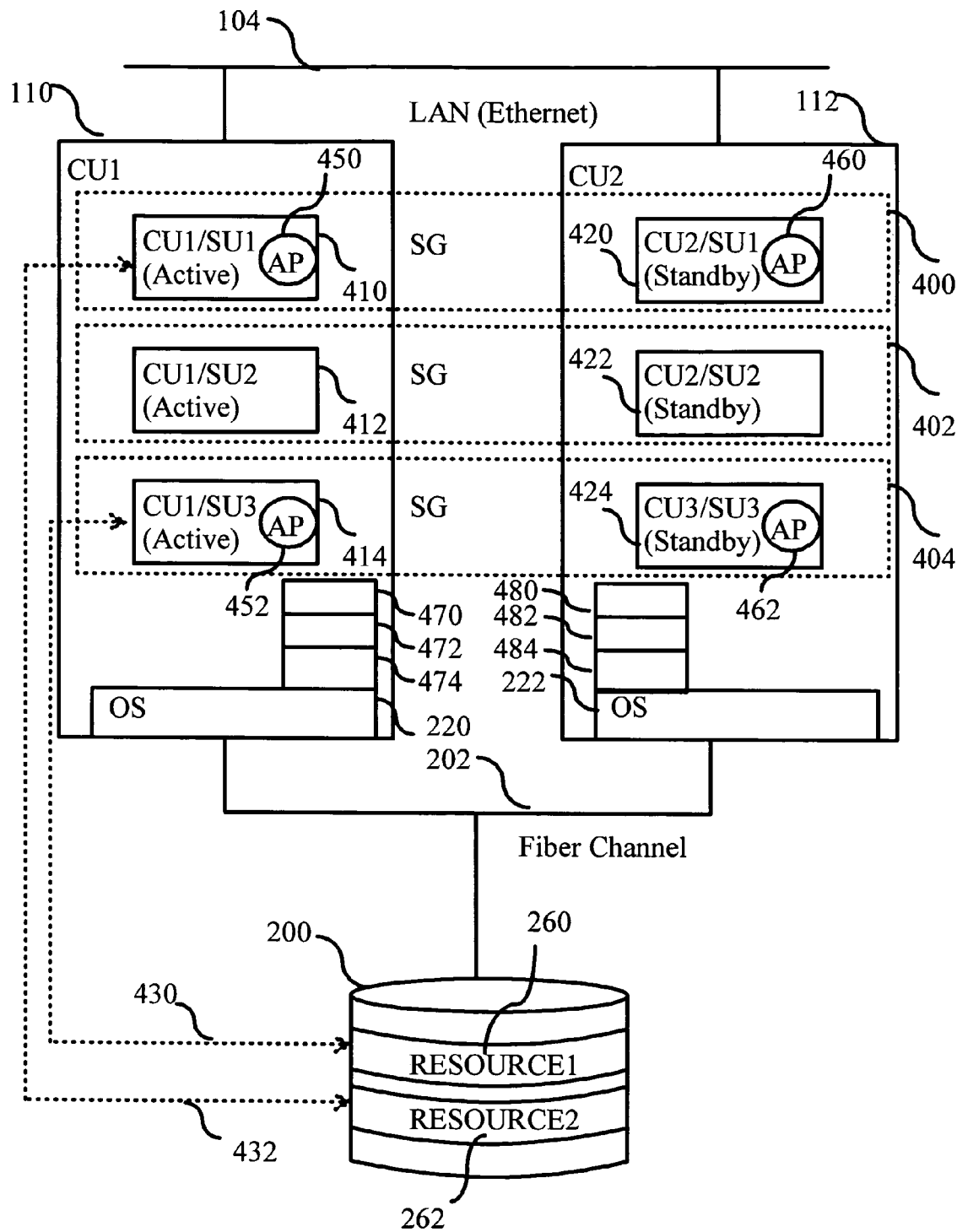
FIG. 4 is a block diagram illustrating a redundant two-unit computer cluster with three Service Groups and two data storage resources prior to switchover, in accordance with the invention.

FIG. 4 is a block diagram depicting one embodiment of the invention comprising a redundant two-unit computer cluster having computer units 110 and 112. In other embodiments of the invention there may as well be any other number of computer units. The computer units are connected using a communication channel 104, which is a local area network (Ethernet). In other embodiments of the invention the communication channel may be based on any other technology. The computer units are connected to a storage unit 200 using a channel 202, which provides high-bandwidth access. Channel 202 may be based on, for example, Fiber Channel (FC), Small Computer System Interface (SCSI) interface, Internet SCSI (iSCSI) or Integrated System Architecture (ISA) bus. Storage unit 200 is a hard disk unit comprising at least one hard disk drive. In other embodiments of the invention storage unit 200 may be based on any type of non-volatile memory such as hard disk drives, optical disks, tape units or flash-memory. Storage unit 200 has data storage resources 260 and 262. The data storage resources may be, for example, file systems, software RAIDs or LVM logical volumes. There are three SGs, namely SGs 400-404. SG 400 has SUs 410 and 420, SG 402 has SUs 412 and 422 and SG 404 has SUs 414 and 424. The SUs 420-424 are replicas for SUs 410-414. If one of SUs 410-414 is to be taken from active state, the corresponding replica from the SUs 420-424 is brought to active state. In FIG. 4 SUs 410-414 are in active state, whereas SUs 422-424 are in standby state. SU 410 has established read-write access to data storage resource 262. There exists thus a read-write access 432 for data storage resource 262 in SU 410. If data storage resource 262 is a file system, SU has read-write mounted it. SU 414 has established read-write access to data storage resource 260. There exists thus a read-write access 430 for data storage resource 260 in SU 414. The situation illustrated in FIG. 4 remains similar until a switchover occurs in which SU 414 must leave active state and SU 424 must enter active state.

In this case read-write access 430 must be transferred i.e. shifted to SU 424. There are access proxies 450, 452, 460 and 462. An access proxy is responsible for ensuring that a read-write access for a data storage resource is transferred reliably and in a controlled manner from an active SU to a passive SU. There must be no overlapping moment when the active and passive SUs access the same data storage resource simultaneously in read-write access mode. In this way file system or generally data storage consistency can be retained. In one embodiment of the invention the access proxy is a software component instance such as a process or thread executing in a computer unit. When decision to perform switchover pertaining to a given SG is made, the access proxy is invoked in an active SU that is about to leave its active state. There is an access proxy per each active SU that owns at least one read-write access to a data storage resource. In one embodiment of the invention there is one access proxy per each SU irrespective of whether the SU owns any read-write accesses. There is also an access proxy per each standby SU that will own at least one read-write access to a data storage resource as soon as the standby SU enters active state. For example, in SG 404 SU 414 has access proxy 452 because SU has established read-write access to data storage resource 260 and has thus read-write access 430.

In FIG. 4 there are switchover control services 470-474 in computer unit 110 and switchover control services 480-484 in computer unit 112. The switchover control services 470-474 take care of tasks associated with service units in computer unit 110. Similarly, the switchover control services 480-484 take care of tasks associated with service units in computer unit 112. The task of switchover control services 470 and 480 is to detect a switchover condition associated with any of the service units 410-414 and 420-424, respectively. The task of switchover control services 472 and 482 is to activate any of the service units 410-414 and 420-424, respectively. A service unit can be brought to activate state after successful access establishment to the data storage resources required by the service unit. The task of switchover control services 474 and 484 is to alter the active state of service units 410-414 and 420-424, respectively, after successful releasing of access to the data storage resources to which read-write access has been established from the service unit. Typically, the active state is altered to standby or faulty. In one embodiment of the invention the switchover control services 470-474 may be performed by a single service in computer unit 110. In this case the switchover control services 470-474 are merely different tasks or procedures in association with a single switchover control service. Similarly, in the same embodiment of the invention the switchover control services 480-484 are performed by a single service in computer unit 112. The switchover control services may be implemented as part of middleware and/or operating system.

Figure 5:
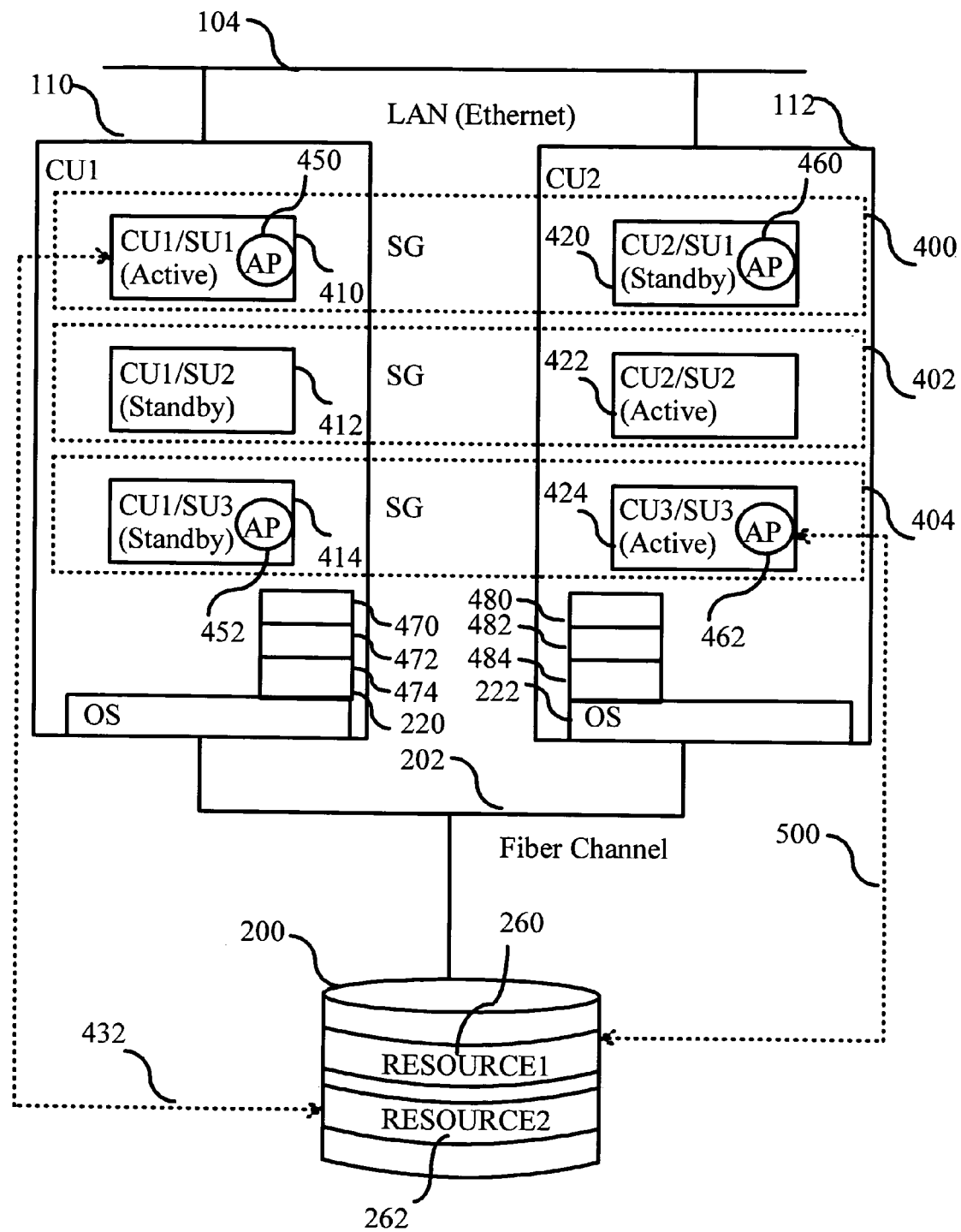
FIG. 5 is a block diagram illustrating a redundant two-unit computer cluster with three Service Groups and two data storage resources after switchover, in accordance with the invention.

FIG. 5 is a block diagram depicting the situation of FIG. 4 when a switchover has taken place in which SU 414 has entered a standby state and an SU 424 has entered active state. Read-write access 432 for data storage resource 262 remains in SU 410, but now a new read-write access 500 for data storage resource 260 in SU 424 has replaced read-write access 430 from FIG. 4.

Figure 6:
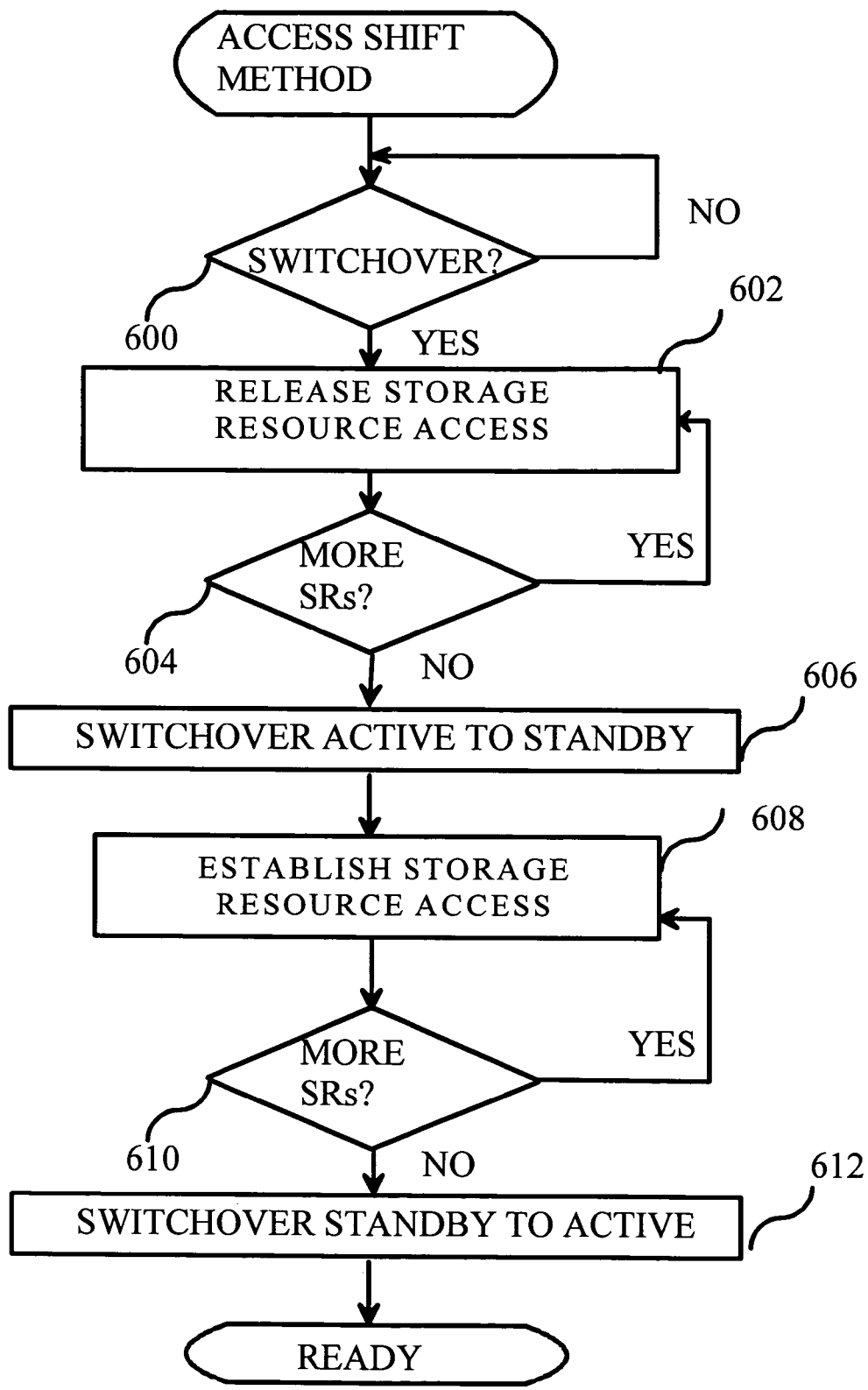
FIG. 6 is a flow chart depicting one embodiment of data storage access shift method in the computer cluster of FIG. 4 or FIG. 5, in accordance with the invention.

FIG. 6 is a flow chart depicting one embodiment of a data storage resource access shift method in the computer cluster of FIG. 4 or FIG. 5, in accordance with the invention. FIG. 6 illustrates the overall access shift procedure from a first SU to a second SU and the actions taken by an access proxy. In one embodiment of the invention switchover condition associated with SU 414 is detected by switchover control service 470 taking care of switchover control for SG 404 for the part of SU 414. Switchover control service 470 works in collaboration with switchover control services 472 and 474. The task of switchover control service 474 is to bring all software components in SU 414 or any other SU in its care to readiness for entering a different state, which in this case is the standby state. Switchover control services 470, 472 and 474 may also take care of the switchover control for other SGs and SUs as well. When SU 414 is to enter the standby state and SU 424 is to enter the active state, the access proxy 452 receives a signal from switchover control service 470. Switchover control services 470, 472 and 474 may be part of operating systems 220 and 222, respectively, or separate services such as middleware software components. In step 600 access proxy 452 waits for a signal from switchover control service 470 that invokes it when a switchover is taking place. The access proxy process may also be spawned at this step. In step 602 access proxy 452 releases access to a data storage resource (SR) to which a read-write access from SU 414 has been established. If the data storage resource is a file system this means that access proxy 452 unmounts the file system. This involves the calling of operating system service responsible for the file system unmounting e.g. Linux system service called umount. If the data storage resource is a Software RAID, the access proxy releases it, in other words, releases access to it. Releasing a Software RAID makes it available for access establishment from another SU.

Herein it is assumed for simplicity that there is at least one data storage resource to which access has been established. In step 604 access proxy checks 452, if there are more data storage resources to which read-write access from SU 414 has been established. If this is the case, processing continues in step 602. In one embodiment of the invention there is a system file or table, which contains information on the data storage resources to which read-write access from SU 414 or alternatively from SU 424 has been established. In other words, there are listed the data storage resources for which read-write access has been established from SG 404. In one embodiment of the invention access proxy 452 signals switchover control service 474 that access to all required data storage resources has been released i.e. they have been released and thus made available for access establishment from elsewhere.

In step 606 the remaining task associated with bringing SU 414 to standby state are performed, for example by switchover control service 474. In one embodiment of the invention a process for access proxy 462 is invoked with a signal indicating that it must start establishing access to data storage resources, because SU 424 is about to enter active state. This signal comes, for example, from switchover control service 480. In one embodiment of the invention the switchover control services 470-474 and 480-484 exchange messaging over communication channel 104.

In step 608 access proxy establishes access to a data storage resource to which read-write access is to be established from SU 424. If the data storage resource is a file system, this involves the calling of operating system service responsible for file system mounting e.g. mount. Herein it is assumed for simplicity that there is at least one data storage resource to which access is to be established. In step 610 access proxy 462 checks, if there are more data storage resources to which read-write access is to be established from SU 424. If this is the case, processing continues at step 608. In step 612 the remaining tasks associated with bringing SU 424 to active state are performed, for example by switchover control service 482. For example, switchover control service 482 may be signaled by access proxy 462 that access to all data storage resources required has been successfully established.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
    performing switchover in a redundant computer cluster comprising at least a first computer unit, a second computer unit, and a shared storage unit, wherein said first computer unit and said second computer unit interface said shared storage unit, said shared storage unit comprises at least two data storage resources;
    executing a first service unit and a second service unit in said first computer unit, both said first service unit and said second service unit comprising at least one software component;
    maintaining a first file access from said first service unit to a first data storage resource among said at least two data storage resources, said first file access comprising reading and writing data to said first data storage resource;
    maintaining a second file access from said second service unit to a second data storage resource among said at least two data storage resources, said first file access being independent of said second file access;
    detecting a switchover condition associated with said first service unit by said first computer unit;
    releasing said first file access to said first data storage resource by said first computer unit, in response to said switchover condition, while maintaining said second file access; and
    altering a state of said first service unit in said first computer unit after successful releasing of said first file access to said first data storage resource.

2. The method according to claim 1, wherein said establishing said first file access and said releasing said first file access are performed by an access proxy, which is associated with said first service unit of said first computer unit.

3. The method according to claim 1, further comprising:
    providing a shared storage unit comprising a disk storage unit.

4. The method according to claim 1, further comprising:
    providing said first data storage resource comprising a file system and said establishing said first file access mounts said file system and said releasing said file access unmounts said file system.

5. The method according to claim 1, further comprising:
    providing said first data storage resource comprising a software redundant array of independent disks.

6. The method according to claim 1, further comprising:
    providing said first computer unit and said second computer unit interfacing a shared storage unit using a peripheral interface.

7. The method according to claim 6, further comprising:
    providing said peripheral interface comprising a fiber channel, a small computer system interface, an internet small computer system interface, or an integrated system interface.

8. An apparatus, comprising:
    a shared storage unit, wherein a first computer unit and a second computer unit interface said shared storage unit, said shared storage unit comprising at least two data storage resources,
    said first computer unit configured to execute a first service unit and a second service unit in said first computer unit, both said first service unit and said second service unit comprising at least one software component, to maintain a first file access from said first service unit to a first data storage resource among said at least two data storage resources, said first file access comprising reading and writing data to said first data storage resource, to maintain a second file access from said second service unit to a second data storage resource among said at least two data storage resources, said first file access being independent of said second file access, to detect a switchover condition associated with said first service unit in said first computer unit, to release said first file access to said first data storage resource, in response to said switchover condition, while maintaining said second file access, to alter a state of said first service unit in said first computer unit after successful releasing of said first file access to said first data storage resource, and
    said second computer unit configured to establish said first file access to said first data storage resource and to allow a service unit corresponding to said first service unit of said first computer unit to become active in said second computer unit.

9. The apparatus according to claim 8, wherein said first computer unit further comprises an access establishment unit and an access releasing unit, which are comprised in an access proxy, which is associated with said first service unit.

10. The apparatus according to claim 8, wherein said shared storage unit comprises a disk storage unit.

11. The apparatus according to claim 8, wherein said at least two data storage resources comprises a file system and an access establishment unit in said first computer unit mounts said file system and an access releasing unit in said first computer unit unmounts said file system.

12. The apparatus according to claim 8, wherein said at least two data storage resources comprises software redundant arrays of independent disks.

13. The apparatus according to claim 8, wherein said first computer unit and said second computer unit are configured to interface said shared storage unit using a peripheral interface.

14. The apparatus according to claim 13, wherein said peripheral interface comprises a fiber channel, an internet small computer system interface, a small computer system interface, or an integrated system interface.

15. An apparatus, comprising:
accessing means for accessing a shared storage unit, which comprises at least two data storage resources;
executing means for executing a first service unit and a second service unit in said apparatus, both said first service unit and said second service unit comprising at least one software component;
first maintaining means for maintaining a first file access from said first service unit to a first data storage resource among said at least two data storage resources, said first file access comprising reading and writing data to said first data storage resource;
second maintaining means for maintaining a second file access from said second service unit to a second data storage resource among said at least two data storage resources, said first file access being independent of said second file access;
detecting means for detecting a switchover condition associated with said first service unit in said apparatus;
releasing means for releasing said first file access to said first data storage resource by said apparatus, in response to said switchover condition, while maintaining said second file access; and
altering means for altering a state of said first service unit in said apparatus after successful releasing of said first file access to said first data storage resource.

16. The apparatus according to claim 15, wherein said means for releasing said first file access are comprised in access proxies, which are associated with service units.

17. The apparatus according to claim 15, wherein said shared storage unit comprises a disk storage unit.

18. The apparatus according to claim 15, wherein said at least two data storage resources comprises a file system and said means for releasing said first file access unmounts said file system.

19. The apparatus according to claim 15, wherein said at least two data storage resource comprises software redundant arrays of independent disks.

20. The apparatus according to claim 15, wherein said computer node interfaces said shared storage unit using a peripheral interface.

21. The apparatus according to claim 20, wherein said peripheral interface comprises a fiber channel, a small computer system interface, an internet small computer system interface, or an integrated system interface.

22. The apparatus according to claim 8, wherein said first service unit and said second service unit both comprises at least one hardware unit.

23. The apparatus according to claim 15, wherein said first service unit and said second service unit comprises at least one hardware unit.

24. An apparatus, comprising:
an interface configured to communicate with a shared storage unit, said shared storage unit comprising at least two data storage resources, and
wherein an operating system is configured to execute a first service unit and a second service unit in said apparatus, both said first service unit and said second service unit comprising at least one software component, to maintain a first file access from said first service unit to a first data storage resource among said at least two data storage resources, said first file access comprising reading and writing data to said first data storage resource, to maintain a second file access from said second service unit to a second data storage resource among said at least two data storage resources, said first file access being independent of said second file access, and
wherein a switchover control software component is configured to detect a switchover condition associated with said first service unit in said apparatus, and
wherein an access release software component is configured to release said first file access to said first data storage resource, in response to said switchover condition, while maintaining said second file access, and
wherein a state change software component is configured to alter a state of said first service unit in said apparatus after successful releasing of said first file access to said first data storage resource.

25. A computer program embodied on a computer readable medium, the computer program comprising code for controlling a processor to execute a method comprising:
accessing a shared storage unit, which comprises at least two data storage resources;
executing a first service unit and a second service unit in a computer unit, both said first service unit and said second service unit comprising at least one software component;
maintaining a first file access from said first service unit to a first data storage resource among said at least two data storage resources, said first file access comprising reading and writing data to said first data storage resource;
maintaining a second file access from said second service unit to a second data storage resource among said at least two data storage resources, said first file access being independent of said second file access;
detecting a switchover condition associated with said first service unit in said computer unit;
releasing said first file access to said first data storage resource by said computer unit, in response to said switchover condition, while maintaining said second file access; and
altering a state of said first service unit in said computer unit after successful releasing of said first file access to said first data storage resource.

26. The method according to claim 1, further comprising:
establishing said first file access to said first data storage resource by said second computer unit; and
allowing a service unit corresponding to said first service unit of said first computer unit to become active in said second computer unit.

* * * * *